United States Patent [19]
Nozaki

[11] Patent Number: 5,990,034
[45] Date of Patent: Nov. 23, 1999

[54] OLEFIN POLYMERIZATION CATALYST

[75] Inventor: Takashi Nozaki, Kibi-gun, Japan

[73] Assignee: Asahi Kasei Kogyo Kabushiki Kaisha, Osaka, Japan

[21] Appl. No.: 08/986,183

[22] Filed: Dec. 5, 1997

[30] Foreign Application Priority Data

Dec. 6, 1996 [JP] Japan .................................. 8-340415

[51] Int. Cl.⁶ .............................. B01J 31/00; B01J 37/00; C08F 4/02; C08F 4/60
[52] U.S. Cl. ........................ 502/132; 502/118; 502/125; 502/128; 502/129; 502/133
[58] Field of Search .................................. 502/128, 125, 502/129, 132, 133, 118

[56] References Cited

U.S. PATENT DOCUMENTS

| | | | |
|---|---|---|---|
| 4,159,965 | 7/1979 | Sakurai et al. | 252/429 B |
| 4,330,646 | 5/1982 | Sakurai et al. | 502/129 |
| 4,330,647 | 5/1982 | Sakurai et al. | 502/125 |
| 4,335,229 | 6/1982 | Sakurai et al. | 502/129 |
| 4,381,252 | 4/1983 | Sakurai et al. | 502/129 |
| 4,431,568 | 2/1984 | Miya et al. | 502/125 |
| 4,471,066 | 9/1984 | Sakurai et al. | 502/113 |
| 5,041,403 | 8/1991 | Nakajo et al. | 502/104 |
| 5,064,798 | 11/1991 | Chang | 502/128 |
| 5,585,317 | 12/1996 | Sacchetti et al. | 502/125 |

FOREIGN PATENT DOCUMENTS

| | | |
|---|---|---|
| 2111312 | 6/1994 | Canada . |
| 0 132 288 | 1/1985 | European Pat. Off. . |
| A2-0136113 | 4/1985 | European Pat. Off. . |
| B-52-37037 | 9/1977 | Japan . |
| B-53-8588 | 3/1978 | Japan . |
| 2-42366 | 9/1990 | Japan . |
| A-3-294302 | 12/1991 | Japan . |
| A-3-294310 | 12/1991 | Japan . |
| 5-7405 | 1/1993 | Japan . |
| 2 056 998 | 3/1981 | United Kingdom .................... 502/129 |

*Primary Examiner*—Mark L. Bell
*Assistant Examiner*—J. Pasterczyk

[57] ABSTRACT

An olefin polymerization catalyst comprising (A) a solid catalyst component and (B) an organometallic compound component. The solid catalyst component (A) is prepared by a process comprising the steps of:

(I) obtaining a solid (A-1) by reacting:
  (i) an organomagnesium component soluble in a hydrocarbon solvent and represented by the formula ($M^1$) $_\alpha(Mg)_\beta(R^1)_p(R^2)_q(OR^3)_r$; and
  (ii) an Si—H bond-containing chlorosilane compound represented by the formula: $H_aSiCl_bR^4_{4-(a+b)}$, in a ratio of from 0.01 to 100 mol (ii) per mol (i);

(II) reacting the solid (A-1) with an alcohol (A-2) in a ratio of from 0.05 to 20 mol of the alcohol per mol of C—Mg bonds contained in the solid (A-1), to form a reaction product; and (III) reacting the reaction product with a titanium compound (A-4). The solid catalyst component (A) is adjusted to have an alkoxy group/titanium molar ratio of 2.4 or lower and an alkoxy group/magnesium molar ratio of 0.15 or lower.

15 Claims, 1 Drawing Sheet

OLEFIN POLYMERIZATION CATALYST

FIELD OF THE INVENTION

This invention relates to an olefin polymerization catalyst and a process for the preparation of a polyolefin using the catalyst component. More specifically, the present invention relates to an olefin polymerization catalyst which can control the molecular weight distribution more easily than the conventional known process, is less deteriorated in its efficiency even after a long-term storage, is free from the deposition of scales in a reactor even after long-term use and provides a polyolefin having excellent properties with good powder properties owing to its considerably high activity; and to a process for the preparation of a polyolefin by using the catalyst component.

BACKGROUND OF THE INVENTION

For a polyolefin, particularly, an ethylene polymer, its molecular weight distribution is a considerably important property which gives an influence on both the processability of its molten substance and final mechanical properties. The application of a polyolefin therefore changes depending on its molecular weight distribution. There is a tendency that polyolefins of a wider molecular weight distribution are used for molded articles such as pipe, those of a medium distribution are used for fibers, tapes and the like, and those of a narrow distribution are used for injection-molded articles such as bottle caps, buckets and the like. In general, the molecular weight distribution of the ethylene polymer largely depends on the properties of a solid catalyst component employed upon polymerization and it is necessary to choose a proper solid catalyst component according to the intended molecular weight distribution. As a catalyst permitting a wide molecular weight distribution, known are catalysts comprising a large variety of transition metal compounds in combination and solid catalysts having a specific surface area or porosity, as described, for example, in JP-B-52-37037 and JP-B-53-8588 ("JP-B" as used herein means an examined published Japanese patent publication) and JP-A-6-220117 (the term "JP-A" as used herein means an "unexamined published Japanese patent application"). For a narrow molecular weight distribution, on the other hand, a number of processes using a specific ether compound upon synthesis of a solid catalyst or upon polymerization are proposed, as described, for example, in JP-A-2-289604, JP-A- 3-294302 and JP-A-3-294310. The above catalysts each serves to provide the intended molecular distribution, but has an unsatisfactory activity per transition metal because transition metals other than a titanium compound are used or an electron donor, such as an ether, which becomes a catalytic poison is added upon synthesis of a solid catalyst or upon polymerization. They are also insufficient from the viewpoint of the powder properties such as particle size and bulk density of the polymer. A solid catalyst component which contains an organomagnesium compound, Si—H bond-containing chlorosilane compound, alcohol and titanium compound as essential components is disclosed in JP-B-2-42366 in which, however, no suggestion is included concerning the controlling method of the molecular weight distribution of a polymer. In JP-B-5-7405, disclosed is a process for obtaining a polymer having a wide molecular weight distribution by using, as an olefin polymerization catalyst composed of a specific magnesium/titanium component, a catalyst in which a molar ratio of an alkoxy group/titanium in a reaction product is lower than a certain value. In the above process, however, activity per titanium metal is insufficient. In U.S. Pat. Nos. 4159965 and 4471066, disclosed is an olefin polymerization catalyst which can provide polymers having a molecular weight distribution over a wide range from narrow to wide molecular weight distribution. In this catalyst, the molecular weight distribution is controlled by using different transition metal components in combination. The activity per transition metal is however not enough for obtaining a polymer having a wide molecular weight distribution. Furthermore, upon preparation of a polyolefin, it is requested in recent years to properly prepare catalysts capable of providing different molecular weight distributions by using solid catalyst components prepared from the same raw materials and by the same preparation process with a view to reducing the manufacturing cost. Therefore, the above-described process using different transition metals in combination is disadvantageous from the viewpoint of the manufacturing cost.

As a process for preparing a polyolefin by polymerizing or copolymerizing an olefin in the presence of such a catalyst, commonly employed is so-called slurry polymerization in which polymerization is effected with a solid catalyst being suspended in a solution. In the case of slurry polymerization, however, a low-molecular weight polymer by-produced upon the polymerization reaction easily dissolves in a polymerization solvent and deposits on the wall of a reactor, which reduces the heat transfer coefficient and makes it difficult to stably carry out long-term continuous operation. Furthermore, the conventional solid catalyst component has a problem in its storage stability, more specifically, lowering in the polymerization activity when stored for a long period of time after preparation. Thus, the conventional solid catalyst component has a difficulty to be used in long-term continuous stable operation.

SUMMARY OF THE INVENTION

Taking into account the above-described problems in conventional art, the present invention has been completed.

The present invention relates to a technique to prepare catalysts each of which provides a different molecular weight distribution of a polymer product, respectively, using solid catalyst components prepared from raw materials and by a preparation process as same as possible.

The present invention further relates to provide an olefin polymerization catalyst, which is less deteriorated in its activity even after long-term storage, is free from the deposition of a polymer on the walls of a reactor upon slurry polymerization, and permits a long-term continuous stable operation, and provides a polyolefin with good powder properties owing to its considerably high activity, and to provide a process for the preparation of a polyolefin by using the catalyst component.

Other objects and effects of the present invention will become apparent from the following description.

The present inventors have conducted extensive research on a catalyst taking into account the above-described problems. As a result, it has been found that upon preparation of a solid catalyst component for olefin polymerization, which contains as essential components an organomagnesium compound, Si-H bond-containing chlorosilane compound, alcohol and titanium compound, polyolefins different in molecular weight distribution can be prepared easily by adjusting the alkoxy group/titanium molar ratio and the alkoxy group/magnesium molar ratio in the solid catalyst to 2.4 or lower and 0.15 to lower, respectively. It has also been found that by dispersing the solid catalyst component in an inert solvent to obtain a slurry and, upon dispersion, adjusting both the chlorine ion concentration and aluminum ion concentration in the supernatant of the slurry to 5 mmol/liter or lower, the solid catalyst component has excellent storage stability, is free from the deposition of the polymer onto the wall of a reactor even after a long-term continuous operation and provides the polymer with good powder properties owing to its considerably high activity. The present invention is based on these findings.

That is, the above-described objectives of the present invention have been achieved by providing:

an olefin polymerization catalyst comprising (A) a solid catalyst component and (B) an organometallic compound component, wherein the solid catalyst component (A) is prepared by a process comprising the steps of reacting:

(A-1) a solid obtained by reacting:

(i) 1 mol of an organomagnesium component which is soluble in a hydrocarbon solvent and which is represented by the formula: $(M^1)_\alpha(Mg)_\beta(R^1)_p(R^2)_q(OR^3)_r$, wherein $M^1$ represents a metal atom belonging to Groups 1, 2, 12 or 13 of the periodic table, $R^1$, $R^2$ and $R^3$ each independently represents a $C_{2-20}$ hydrocarbon group, and $\alpha$, $\beta$, p, q and r are numerals which satisfy the relationships: $0 \leq \beta$; $0 < \alpha$; $0 \leq p$; $0 \leq q$; $0 < r$; $p+q>0$; $0 \leq r/(\alpha+\beta) \leq 2$; and $k\alpha+2\beta=p+q+r$, with the proviso that k represents a valence of $M^1$; and (ii) 0.01 to 100 mol of an Si—H bond-containing chlorosilane compound represented by the formula: $H_aSiCl_bR^4{}_{4-(a+b)}$ wherein $R^4$ represents a $C_{1-20}$ hydrocarbon group and a and b are numerals which satisfy the relationships: $0<a$; $0 <b$; and $a+b \leq 4$;

(A-2) 0.05 to 20 mol of an alcohol per 1 mol of a C-Mg bond contained in the solid (A-1); and optionally (A-3) an organometallic compound represented by the formula: $M^2R^5{}_sQ_{t-s}$ wherein $M^2$ represents a metal atom belonging to Groups 1, 2, 12 or 13 of the periodic table, $R^5$ represents a $C_{1-20}$ hydrocarbon group, Q represents a group selected from $OR^6$, $OSiR^7R^8R^9$, $NR^{10}R^{11}$, $SR^{12}$ and halogen atoms (wherein $R^6$, $R^7$, R8, $R^9$, $R^{10}$, $R^{11}$ and $R^{12}$ each independently represents a hydrogen atom or a hydrocarbon group), 0<s and t stands for a valence of $M^2$; and reacting the reaction product with (A-4) a titanium compound in the presence or absence of the component (A-3), the solid catalyst component being adjusted to have an alkoxy group/titanium molar ratio of 2.4 or lower and an alkoxy group/magnesium molar ratio of 0.15 or lower.

In a preferred embodiment, the optional organometallic compound (A-3) is used in a molar ratio to the alcohol (A-2) of from not less than 0.1 to less than 10, and the titanium compound (A-4) is used in an amount of 0.5 mol or less per 1 mol of a C-Mg bond contained in the solid (A-1).

In a further preferred embodiment, the solid catalyst component (A) is prepared as a slurry in an inert solvent, and the supernatant of the slurry has a chlorine ion concentration and an aluminum ion concentration of each 5 mmol/liter or lower.

BRIEF DESCRIPTION OF THE PREFERRED EMBODIMENTS

Figure 1:
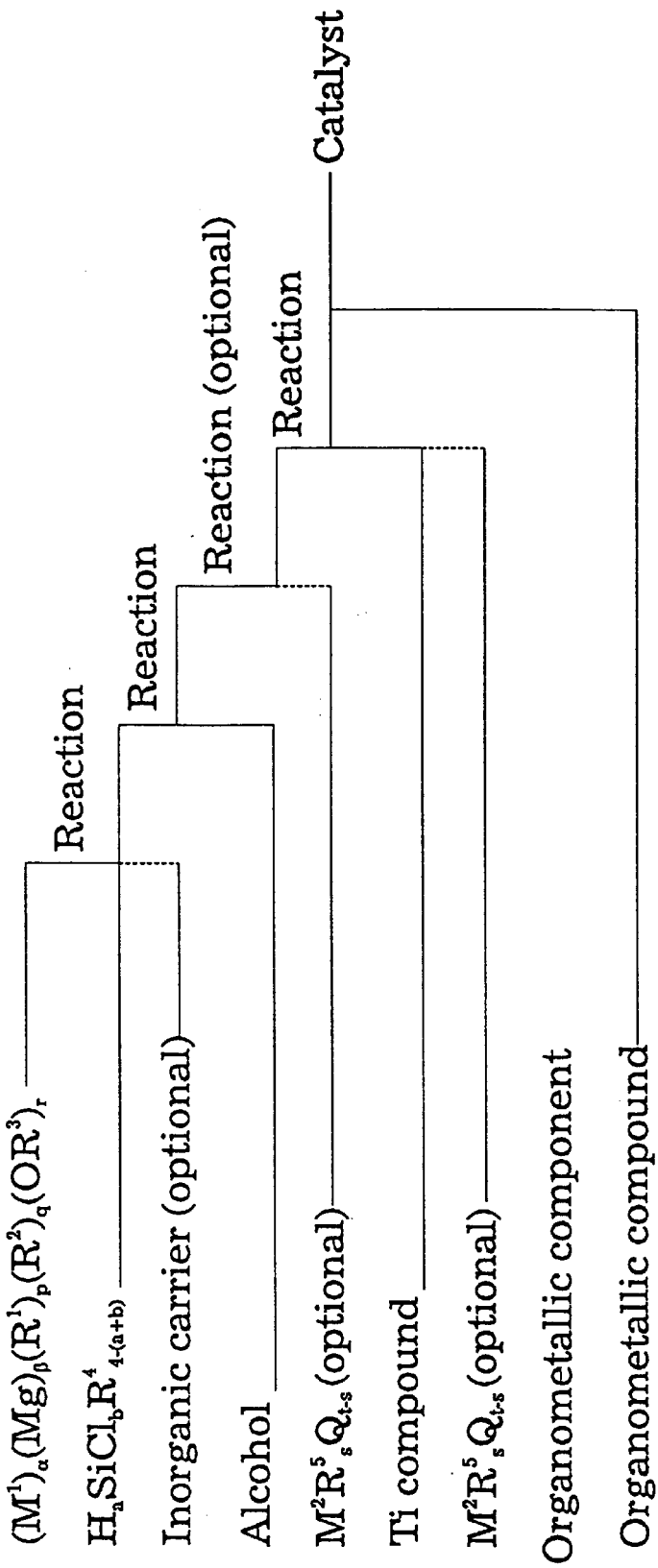
FIG. 1 is a flow sheet illustrating the composition of the catalyst according to the present invention.

The present invention is described in more detail below.

The organomagnesium compound for use in the present invention is represented by the following formula:

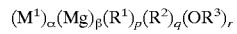

wherein $M^1$ represents a metal atom belonging to Groups 1, 2, 12 or 13 of the periodic table; $R^1$, $R^2$ and $R^3$ each independently represents a $C_{2-20}$ hydrocarbon group; and $\alpha$, $\beta$, p, q and r are numerals which satisfy the following relationships:

$0 \leq \alpha$; $0<\beta$; $0 \leq p$; $0 \leq q$; $0 \leq r$; $0 \leq r/(\alpha+\beta) \leq 2$; and $k\alpha+2=p+q+r$, with the proviso that k represents a valence of $M^1$. This compound is indicated in the form of a complex compound of an organomagnesium soluble in a hydrocarbon solvent, but includes all the compounds represented by $R^2Mg$ and the complexes thereof with another metallic compound. The relational formula of $\alpha$, $\beta$, p, q and r, that is, $k\alpha+2\beta=p+q+r$ shows the stoichiometry between the valence of a metal atom and a substituent.

Examples of the hydrocarbon group represented by $R^1$ or $R^2$ in the above formula include alkyl, cycloalkyl and aryl groups, more specifically, methyl, ethyl, propyl, butyl, amyl, hexyl, decyl, cyclohexyl and phenyl. Among them, alkyl groups are preferred as $R^1$.

In the case where a $\alpha<0$, metal elements belonging to Groups 1, 2, 12 or 13 of the periodic table can be used. Examples include lithium, sodium, potassium, beryllium, zinc, boron and aluminum. Among them, aluminum, boron, beryllium and zinc are particularly preferred.

The ratio of the magnesium to the metal atom $M^1$ ($\beta/\alpha$) can be appropriately selected, but is preferred to fall within a range of from 0.1 to 30, particularly from 0.5 to 10.

When a certain organomagnesium compound of the above formula wherein a=O is employed, a compound having as $R^1$ sec-butyl or the like is soluble in a hydrocarbon solvent, and such a compound also brings about favorable results in the present invention.

When a=0 in the formula: $(M^1)_\alpha(Mg)_\beta(R^1)_p(R^2)_q(OR^3)_r$, it is preferred that $R^1$ and $R^2$ are any one of the following three groups (1), (2) and (3).

(1) At least one of $R^1$ and $R^2$ represents a secondary or tertiary alkyl group having 4 to 6 carbon atoms. Preferably, $R^1$ and $R^2$ both have 4 to 6 carbon atoms, and at least one of them represents a secondary or tertiary alkyl group.

(2) $R^1$ and $R^2$ represent alkyl groups but are different in the number of carbon atoms. Preferably, $R^1$ represents an alkyl group having 2 to 3 carbon atoms, while $R^2$ represents an alkyl group having at least 4 carbon atoms.

(3) At least one of $R^1$ and $R^2$ represents a hydrocarbon group having at least 6 carbon atoms. Preferably $R^1$ and $R^2$ both represent an alkyl group having at least 6 carbon atoms.

Specific examples of these groups are described below.

Examples of the secondary or tertiary alkyl group having 4 to 6 carbon atoms in the above item (1) include sec-butyl, tert-butyl, 2-methylbutyl, 2-ethylpropyl, 2,2-dimethylpropyl, 2-methylpentyl, 2-ethylbutyl, 2,2-dimethylbutyl and 2-methyl-2-ethylpropyl. Among them, sec-butyl is particularly preferred.

Examples of the alkyl group having 2 or 3 carbon atoms in the above item (2) include ethyl and propyl, with ethyl being particularly preferred. Examples of the alkyl group having at least 4 carbon atoms include butyl, amyl, hexyl and octyl. Among them, butyl and hexyl are particularly preferred.

Examples of the hydrocarbon group having at least 6 carbon atoms in the above item (3) include hexyl, octyl, decyl and phenyl. Among them, alkyl groups are preferred with hexyl being particularly preferred.

In general, with an increase in the number of carbon atoms of the alkyl group, solubility in a hydrocarbon solvent increases but at the same time viscosity of the resulting solution tends to rise. It is therefore not desired to use an alkyl group having an unnecessarily long chain from the viewpoint of handling.

The above-described organomagnesium compound is used in the form of a hydrocarbon solution thereof. If a trace amount of a complexing agent such as ether, ester or amine is contained or remains in the solution, it can be used without problems.

The alkoxy group ($OR^3$) is explained below.

As the hydrocarbon group represented by $R^3$, alkyl or aryl groups having 3 to 10 carbon atoms are preferred. Specific examples include n-propyl, n-butyl, sec-butyl, tert-butyl, amyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, n-octyl, n-decyl, and phenyl. Among them, preferred are n-butyl, sec-butyl, 2-methylpentyl and 2-ethylhexyl.

The organomagnesium compound or organomagnesium complex as described above can be obtained by reacting an organomagnesium compound represented by the formula: $R^1MgX$ or $R^1{}_2Mg$ (in which $R^1$ has the same meaning as defined above and X represents a halogen) and an organometallic compound represented by the formula: $M^1R^2{}_k$ or $M^1R^2{}_{k-1}H$ (in which $M^1$, $R^2$ and k have the same meanings as defined above, respectively) in an inert hydrocarbon solvent such as hexane, heptane, cyclohexane, benzene or toluene at a temperature between room temperature to 150° C. and, if necessary, followed by reacting with an alcohol having a hydrocarbon group represented by $R^3$ or a hydrocarbyloxymagnesium compound having a hydrocarbon group represented by $R^3$, soluble in a hydrocarbon solvent, and/or a hydrocarbyloxyaluminum compound having a hydrocarbon group represented by $R^3$, soluble in a hydrocarbon solvent.

The reaction between the organomagnesium component soluble in a hydrocarbon and the alcohol can be effected by any one of the following methods, that is, a method of adding the alcohol to the organomagnesium component, a method of adding the organomagnesium component to the alcohol and a method of adding both components simultaneously.

In the present invention, no particular limitation is imposed on the reaction ratio of the organomagnesium component soluble in a hydrocarbon to the alcohol, but it is preferred that in the alkoxy-containing organomagnesium component thus obtained, the molar composition ratio, $r/(\alpha+\beta)$, of the alkoxy group to the total metal atoms falls within a range of $0<r/(\alpha+\beta)\leq2$, with $0\leq r/(\alpha+\beta)<1$ being particularly preferred.

The Si—H bond-containing chlorosilane compound for use in the present invention is explained below.

The chlorosilane compound for use in the present invention is represented by the following formula:

$$H_aSiCl_bR^4{}_{4-(a+b)}$$

wherein $R^4$ represents a $C_{1-20}$ hydrocarbon group and a and b are numerals which satisfy the following relationships: $0<a$; $0<b$; and $a+b\leq4$. In the above formula, examples of the hydrocarbon group represented by $R^4$ include aliphatic hydrocarbon groups, alicyclic hydrocarbon groups and aromatic hydrocarbon groups, more specifically, methyl, ethyl, butyl, amyl, hexyl, decyl, cyclohexyl and phenyl. Among them preferred are $C_{1-10}$ alkyl groups, with lower alkyl groups such as methyl, ethyl and propyl being particularly preferred. In addition, a and b are numerals which satisfy the relationship of $a+b\leq4$ and are greater than 0, with the case where b stands for 2 or 3 being particularly preferred.

Examples thereof include $HSiCl_3$, $HSiCl_2CH_3$, $HSiCl_2C_2H_5$, $HSiCl_2(n-C_3H_7)$, $HSiCl_2(iso-C_3H_7)$, $HSiCl_2(n-C_4H_9)$, $HSiCl_2C_6H_5$, $HSiCl_2(para-chlorobenzyl)$, $HSiCl_2CH=CH_2$, $H_2SiCl_2CH_2C_6H_5$, $HSiCl_2(1-naphthyl)$, $HSiCl_2CH_2CH=CH_2$, $H_2SiClCH_3$, $H_2SiClC_2H_5$, $HSiCl(CH_3)_2HSiCl(C_2H_5)_2$, $HSiClCH_3(iso-C_3H_7)$, $HSiClCH_3(C_6H_5)$ and $HSiCl(C_6H_5)_2$. These compounds may be used either singly or in combination. As the chlorosilane compound, trichlorosilane, monomethyldichlorosilane, dimethylchlorosilane and ethyldichlorosilane are preferred, with trichlorosilane and monomethyldichlorosilane being particularly preferred.

The reaction between the organomagnesium component and the chlorosilane compound is explained below.

Upon reaction, it is preferred to use the chlorosilane compound after diluting it beforehand in an inert reaction solvent, for example, alicyclic hydrocarbon such as n-hexane or n-heptane, aromatic hydrocarbon such as benzene, toluene or xylene, aliphatic hydrocarbon such as cyclohexane or methyl cyclohexane, chlorinated hydrocarbon such as 1,2-dichloroethane, o-dichlorobenzene or dichloromethane or an ether base solvent such as ether or tetrahydrofuran or a mixture thereof. Among them, an aliphatic hydrocarbon is preferred as a solvent from the viewpoint of the performances of the catalyst. No particular limitation is imposed on the reaction temperature but the reaction is effected at the boiling point of the chlorosilane or higher, or 40° C. or higher, for the progress of the reaction. No particular limitation is imposed on the reaction ratio of two components but the chlorosilane compound is generally used in an amount of 0.01 to 100 mol, preferably 0.1 to 10 mol, per mol of the organomagnesium component.

Examples of the reaction method include a simultaneous-addition method in which two components are reacted while introduced into a reaction zone simultaneously, a method in which the chlorosilane compound is charged in a reaction zone beforehand and reaction is effected while the organomagnesium component is introduced into the reaction zone, and a method in which the chlorosilane compound is added to the organomagnesium component which has been charged beforehand. The second method in which the chlorosilane compound is charged in a reaction zone beforehand and reaction is effected while the organomagnesium component is introduced into the reaction zone brings about favorable results.

It is preferred that the solid component obtained by the above reaction is separated by filtration or decantation, followed by washing sufficiently with an inert solvent such as n-hexane or n-heptane, to thereby remove unreacted substances, byproducts and the like.

The reaction between the organomagnesium component and the chlorosilane compound can be effected in the presence of an inorganic carrier. As the inorganic carrier, the following compounds can be employed.

(iii) Inorganic oxides.

(iv) Inorganic carbonates, silicates, sulfates.

(v) Inorganic hydroxides.

(vi) Complex salts, solid solutions or mixtures composed of (iii) to (V).

Specific examples of the inorganic carrier include silica, alumina, silica alumina, hydrated alumina, magnesium oxide, thorium oxide, titanium oxide, zirconium oxide, calcium phosphate, barium sulfate, calcium sulfate, magnesium silicate, magnesium.calcium, aluminum silicate [(Mg.Ca)O.Al$_2$O$_3$.5SiO$_2$.nH$_2$O], aluminum potassium silicate [K$_2$O.3Al$_2$O$_3$.6SiO$_2$.2H$_2$O], iron magnesium silicate [(Mg.Fe)$_2$SiO$_4$], aluminum silicate (Al$_2$O$_3$.SiO$_2$) and calcium carbonate. Among them, particularly preferred are silica and silica.alumina. The inorganic carrier has preferably a specific surface area of 20 m$^2$/g or greater, with 90 m$^2$/g or greater being particularly preferred.

The alcohol to be reacted with the solid is explained below.

As the alcohol, saturated or unsaturated alcohols having 1 to 20 carbon atoms can be exemplified. Specific examples thereof include methyl alcohol, ethyl alcohol, propyl alcohol, butyl alcohol, amyl alcohol, hexyl alcohol, cyclohexanol, phenol and cresol. Linear C$_{3-8}$ alcohols are particularly preferred.

The alcohol is used in an amount of 0 to 20 mol, preferably 0.1 to 10 mol, particularly 0.2 to 8 mol, per mol of a C—Mg bond contained in the solid (A-1). The reaction between the solid (A-1) and the alcohol is effected in the presence or absence of an inert solvent. Any one of the above-exemplified aliphatic, aromatic and alicyclic hydrocarbons can be used as the inert solvent. No particular limitation is imposed on the reaction temperature but the reaction is preferably performed from room temperature to 200° C.

In the present invention, it is possible to react the reaction product thus obtained with a specific organometallic compound after the above-described reaction with the alcohol.

The specific organometallic compound component for use herein is represented by the following formula:

$$M^2R^5_sQ_{t-s}$$ 

wherein M$^2$ represents a metal atom belonging to Groups 1, 2, 12 or 13 of the periodic table, R$^5$ represents a C$_{1-20}$ hydrocarbon group, Q represents a group selected from OR$^6$, OSiR$^7$R$^8$R$^9$, NR$^{10}$OR$^{11}$, SR$^{12}$ and halogen in which R$^6$, R$^7$, R$^8$, R$^9$, R$^{10}$, R$^{11}$ and R$^{12}$ each independently represents a hydrogen atom or a hydrocarbon group, 0<s, and t stands for a valence of M$^2$. M$^2$ represents a metal atom belonging to Groups 1, 2, 12 or 13 the periodic table. Specific examples thereof include lithium, sodium, potassium, beryllium, magnesium, boron and aluminum, with magnesium, boron and aluminum being particularly preferred. Examples of the hydrocarbon group represented by R$^5$ include alkyl, cycloalkyl and allyl groups, more specifically, methyl, ethyl, propyl, butyl, amyl, hexyl, octyl, decyl, cyclohexyl and phenyl. Among them, alkyl groups are preferred. Q represents a group selected from OR$^6$, OSiR$^7$R$^8$R$^9$, NR$^{10}$R$^{11}$, SR$^{12}$ and halogen in which R$^6$, R$^7$, R$^8$, R$^9$, R$^{10}$, R$^{11}$ and R$^{12}$ each independently represents a hydrogen atom or a hydrocarbon group. Q is particularly preferably a halogen. Examples of the organometallic compound component include methyl lithium, butyl lithium, methyl magnesium chloride, methyl magnesium bromide, methyl magnesium iodide, ethyl magnesium chloride, ethyl magnesium bromide, ethyl magnesium iodide, butyl magnesium chloride, butyl magnesium bromide, butyl magnesium iodide, dibutyl magnesium, dihexyl magnesium, triethylboron, trimethylaluminum, dimethylaluminum bromide, dimethylaluminum chloride, dimethylaluminum methoxide, methylaluminum dichloride, methylaluminum sesquichloride, triethylaluminum, diethylaluminum chloride, diethylaluminum bromide, diethylaluminum ethoxide, ethylaluminum dichloride, ethylaluminum sesquichloride, tri-n-propyl aluminum, tri-n-butyl aluminum, tri-iso-butyl aluminum, tri-n-hexyl aluminum, tri-n-octylaluminum and tri-n-decyl aluminum, with organoaluminum compounds being particularly preferred. The organometallic compound is used in an amount of 0 to 20 mol, preferably 0.1 to 10 mol relative to the alcohol. No particular limitation is imposed on the reaction temperature, but the temperature falling within a range not lower than room temperature but not higher than the boiling point of the reaction solvent is preferred.

The titanium compound for use in the present invention is described below.

As the titanium compound, employed are those represented by the following formula: Ti(OR$^{13}$)$_u$X$_{4-u}$ wherein $0 \leq u \leq 4$. Examples of the hydrocarbon group represented by R$^{13}$ include aliphatic hydrocarbon groups such as methyl, ethyl, propyl, butyl, amyl, hexyl, 2-ethylhexyl, heptyl, octyl, decyl and allyl; alicyclic hydrocarbon groups such as cyclohexyl, 2-methylcyclohexyl and cyclopentyl; and aromatic hydrocarbon groups such as phenyl and naphthyl. Among them, aliphatic hydrocarbon groups are preferred. Examples of the halogen represented by X include chlorine, bromine and iodine, with chlorine being preferred. It is possible to employ at least two of the titanium compounds selected from the above ones as a mixture.

For the reaction between the solid substance and the titanium compound, an inert reaction solvent is used. Examples of the inert reaction solvent include aliphatic hydrocarbons such as hexane and heptane, aromatic hydrocarbons such as benzene and toluene, and alicyclic hydrocarbons such as cyclohexane and methyl cyclohexane. Among them, aliphatic hydrocarbons are preferred. The titanium compound is preferably used in an amount of 0.5 mol or smaller per mol of the C-Mg bond contained in the solid component, with 0.1 mol or smaller being particularly preferred. No particular limitation is imposed on the reaction temperature, but it is preferred to carry out the reaction within a range of from room temperature to 150° C. The reaction can also be carried out in the presence of an organometallic compound. In this case, the organometallic compound is added, followed by the addition of the titanium compound. It is also possible to add the organometallic compound subsequent to the titanium compound or to add them simultaneously, but the addition of the organometallic compound and then titanium compound is preferred. The molar ratio of the organometallic compound to the titanium compound is preferably 0.1 to 10, with 0.5 to 2 being particularly preferred.

The catalyst thus obtained is generally used in the solid form after drying or in the form of a slurry in an inert solvent. Examples of the inert solvent include aliphatic hydrocarbons such as hexane and heptane, aromatic hydrocarbons such as benzene, toluene and xylene, alicyclic hydrocarbons such as cyclohexane and methyl cyclohexane, and halogenated hydrocarbons such as 1,2-dichloroethane, carbon tetrachloride and chlorobenzene. When the catalyst is used in the form of a slurry in an inert solvent, it is preferred to adjust the chlorine ion concentration and aluminum ion concentration in the supernatant of the slurry of the solid catalyst component to 5 mmol/liter or smaller, respectively. The chlorine and aluminum ion concentrations in the supernatant can be adjusted below the intended concentrations by washing or diluting with the above-described inert solvent. No particular limitation is imposed on the temperature at the time of washing, but washing at the temperature not lower than 30° C. but not higher than 100° C. makes it possible to decrease their concentrations below the target concentration more promptly. It is not preferred to dilute the slurry by washing through filtration or with a large amount of an inert solvent to an intended concentration or lower from the economical point of view.

A polymerization catalyst of higher activity can be obtained by using the solid catalyst component of the present invention and the organometallic compound component (B) in combination.

As the organometallic compound component (B), compounds belonging to Groups 1, 2, 12, or 13 of the periodic table, particularly complexes containing an organoaluminum compound and/or organomagnesium, are preferred.

Examples of the organoaluminum compound include trialkylaluminums such as trimethylaluminum, triethylaluminum, tri(n-propyl)aluminum, tri(n-butyl) aluminum, tri(iso-butyl)aluminum, tri(n-amyl)aluminum, tri(iso-amyl)aluminum, tri(n-hexyl)aluminum, tri(n-octyl) aluminum and tri(n-decyl)aluminum; aluminum halides such as diethylaluminum chloride, ethylaluminum dichloride, di(iso-butyl)aluminum chloride, ethylaluminum sesquichloride and diethylaluminum bromide; alkoxyaluminums such as diethylaluminum ethoxide and di(iso-butyl) aluminum butoxide; siloxyalkylaluminums such as dimethylhydroxyaluminum dimethyl, ethylmethylhydrosiloxyaluminum diethyl and ethyldimethylsiloxyaluminum diethyl; and mixtures thereof. Among them, trialkylaluminums are particularly preferred, because they provide the resulting catalyst with the highest activity.

The complex containing an organomagnesium is represented by the above-described formula: $(M^1)_\alpha(Mg)_\beta(R^1)_p (R^2)_q(OR^3)_r$, wherein $\alpha$, $\beta$, p, q, r, $M^1$, $R^1$, $R^2$ and $OR^3$ have the same meanings as defined above. Since a complex soluble in a hydrocarbon is desired, $\beta/\alpha$ a is preferably from 0.5 to 10, with a complex having aluminum as $M^1$ being particularly preferred.

The catalyst thus obtained has features that it has markedly high activity for the polymerization of ethylene or for the copolymerization of ethylene and an $\alpha$-olefin having at least three carbon atoms, so that the resulting polymer has excellent particulate properties. By using a solid catalyst component which is adjusted to have an alkoxy group/titanium molar ratio of 2.4 or lower and an alkoxy group/magnesium molar ratio of 0.15 or lower, the molecular weight distribution of the resulting ethylene polymer can be controlled easily from the narrow one to the wide one. Upon use of the solid catalyst component in the form of a slurry in an inert solvent, the activity is hardly deteriorated even after a long-term storage, and moreover, in the slurry polymerization, a long-term continuous stable operation can be conducted without deposition of the polymer to the wall of the reactor by adjusting the chlorine and aluminum ion concentrations in the supernatant of the slurry of the solid catalyst component to 5 mmol/liter or lower, respectively. In other words, when among solid catalyst components which are adjusted to have an alkoxy group/titanium molar ratio of 2.4 or lower and an alkoxy group/magnesium molar ratio of 0.15 or lower, one adjusted to have a relatively high molar ratio is used, a polymer having a narrow molecular weight distribution can be obtained. On the other hand, a solid catalyst component having relatively low alkoxy group/titanium and alkoxy group/magnesium molar ratios within the predetermined range is used, a polymer having a wide molecular weight distribution can be obtained. As described above, the molecular weight distribution can be controlled freely by an increase or decrease of the alkoxy group/titanium and alkoxy group/magnesium molar ratios within the limited range, and storage stability can be improved by lowering the chlorine and aluminum ion concentrations in the supernatant of the slurry of the solid catalyst component. Such advantages are beyond expectation in the prior art but the reason why they can be brought about is not known at all.

In the present invention, the molar ratios of the alkoxy group/titanium and alkoxy group/magnesium in the solid catalyst component can be adjusted easily by varying the reaction amounts of the alcohol, organometallic compound and titanium compound.

Thus, in the present invention, solid catalysts of markedly high activity which can provide different molecular weight distributions can be prepared only by adjusting the molar ratios of alkoxy group/titanium and alkoxy group/magnesium in the solid catalyst component. According to the present invention, it is possible to prepare catalysts which permit the preparation of ethylene polymers having FR, which is a measure of molecular weight distribution, falling within a range of 25 to 100, the FR being a quotient obtained by dividing a value as measured at 190° C. under a load of 21.6 kg by a value as measured at 190° C. under a load of 2.16 kg in accordance with ASTM D-1238.

The solid catalyst component and organometallic compound component may be added to a polymerization system under the polymerization conditions or may be combined prior to the polymerization. It is preferred that the organometallic compound is added in an amount of 1 to 3000 mmol per g of the solid catalyst component.

Examples of the olefin to be polymerized in the catalyst system of the present invention include ethylene, propylene, 1-butene, 1-pentene, 1-hexene, 4-methyl-1-pentene, 1-octene, 1-decene, 1-dodecene, 1-tetradecene, 1-hexadecene, 1-octadecene, 1-eicosene and vinyl cyclohexane. Some of them can be combined and used for copolymerization.

As the polymerization catalyst, hydrocarbon solvents ordinarily employed for slurry polymerization can be used. Specific examples include aliphatic hydrocarbons such as hexane and heptane, aromatic hydrocarbons such as benzene, toluene and xylene and alicyclic hydrocarbons such as cyclohexane and methyl cyclohexane. They can be used either singly or in combination.

The polymerization temperature may be from room temperature to 100° C., with 50 to 90° C. being preferred. Polymerization is effected at a pressure falling within a range of normal pressure to 100 atmospheric pressure. The molecular weight of the polymer thus obtained can be adjusted by permitting hydrogen to exist in the reaction system or by changing the polymerization temperature.

EXAMPLES

The present invention will be described in detail with reference to the following Examples, but the invention should not be construed as being limited thereto.

In the examples, MI represents a melt index as measured at 190° C. under a load of 2.16 kg in accordance with ASTM D-1238. FR represents a quotient obtained by dividing a value as measured at 190° C. under a load of 21.6 kg by MI, which is a measure of molecular weight distribution.

Example 1
(1) Synthesis of a Magnesium-Containing Solid by the Reaction with a Chlorosilane Compound In a fully-nitrogen-purged 15-liter reactor, 2740 ml of trichlorosilane ($HSiCl_3$) as a 2 mol/liter n-heptane solution were charged. They were kept at 65° C. while being stirred, to which 7 liters (5 mol in terms of magnesium) of a solution of an organomagnesium component represented by the compositional formula: $AlMg_6(C_2H_5)_3(n-C_4H_9)_{10.8}(On-C_4H_9)_{1.2}$ n-heptane were added over one hour. The resulting mixture was reacted at 65° C. for one hour under stirring. After the completion of the reaction, the supernatant was removed and the residue was washed four times with 7 liters of n-hexane, to thereby obtain a solid substance in the form of a slurry. The solid substance was separated and then dried. As a result of the analysis of the solid thus obtained, it contained 8.62 mmol of Mg, 17.1 mmol of Cl and 0.84 mmol of n-butoxy group ($On-C_4H_9$) per gram of the solid.

(2) Synthesis of a Solid Catalyst

The slurry containing 500 g of the above-described solid, and 2160 ml of a 1 mol/liter n-hexane solution of n-butyl alcohol were reacted at 50° C. for one hour under stirring. After the completion of the reaction, the supernatant was removed and the residue was washed once with 7 liters of n-hexane. The resulting slurry was maintained at 50° C. To the slurry, 970 ml of a 1 mol/liter n-hexane solution of diethylaluminum chloride were added under stirring and they were reacted for one hour. After the completion of the reaction, the supernatant was removed, and the residue was washed twice with 7 liters of n-hexane. The resulting slurry was maintained at 50° C. To the slurry, 200 ml of a 1 mol/liter n-hexane solution of diethylaluminum chloride and 200 ml of a 1 mol/liter n-hexane solution of titanium tetrachloride were added and they were reacted for two hours. After the completion of the reaction, the supernatant was removed. With the internal temperature being maintained at 50° C., the residue was washed four times with 7 liters of n-hexane, to thereby obtain a solid catalyst component [A-1] as a hexane slurry solution. In the solid catalyst component thus obtained, the molar ratio of the alkoxy group/titanium was 2.17 and that of the alkoxy group/magnesium was 0.119. In the supernatant of the slurry the chlorine ion concentration was 2.5 mmol/liter and the aluminum ion concentration was 3.5 mmol/liter.

(3) Polymerization of Ethylene

In a reactor having an internal volume of 230 liters and equipped with a jacket, continuous polymerization for an ethylene-1-butene copolymer was conducted in n-hexane as a solvent at the liquid level of 170 liters in the presence of the solid catalyst component synthesized in the above (2). To the reactor, the above-described solid catalyst component [A-1], triisobutyl aluminum, purified n-hexane, ethylene, butene-1 and hydrogen were fed continuously at rates of 0.5 g/hr, 15 mmol/hr, 60 liters/hr, 10 kg/hr, 1 liter/her and 50 liters/hr, respectively, and continuous polymerization was effected for three weeks at polymerization temperature of 85° C., total pressure of 10 kg/cm² and average residence time of 1.9 hours.

The average polymerization activity during that time was 20000 g-polymer/g-catalyst.hr and almost no deterioration in the activity was recognized for three-week operation. The polymer thus obtained had an MI of 1.0 g/10 min, an FR of 26.5 and a bulk density of 0.43 g/cm³. Heat was removed stably by passing water through the jacket. The overall heat transfer coefficient on the transfer surface immediately after the starting of the polymerization was 486 kcal/m²·hr·deg, while that immediately before the completion of the present invention was 449 kcal/m²·hr·deg. As the result of overhaul inspection after the operation had finished, almost no deposition of the polymer was recognized onto the wall of the reactor.

Example 2

Under similar conditions to Example 1, except that the amount of n-butyl alcohol was charged to 1080 ml and the amount of diethylaluminum chloride was changed from 970 ml to 1510 ml, a solid catalyst component [A-2] was synthesized. In the solid catalyst component [A-2] thus obtained, the molar ratio of the alkoxy group/titanium was 1.11 and that of the alkoxy group/magnesium was 0.061. In the supernatant of the slurry, the chlorine ion concentration was 2.6 mmol/liter and the aluminum ion concentration was 3.6 mmol/liter. As the result of the polymerization using the catalyst as in Example 1, the average polymerization activity was 21000 g-polymer/g-catalystehr and almost no deterioration in the activity was recognized for three-week operation. The polymer thus obtained had an MI of 1.3 g/10 min, an FR of 39.5 and a bulk density of 0.43 g/cm³. Heat was removed stably by passing water through the jacket. The overall heat transfer coefficient on the transfer surface immediately after the beginning of the polymerization was 476 kcal/m²·hr·deg, while that immediately before the completion of the present invention was 445 kcal/m²·hr·deg. As the result of overhaul inspection after the operation had finished, almost no deposition of the polymer was recognized onto the wall of the reactor.

Example 3

A solid catalyst component was synthesized under the following conditions.

In a fully-nitrogen-purged 15-liter reactor, 5700 ml of trichlorosilane ($HSiCl_3$) as a 1 mol/liter n-heptane solution were charged. They were kept at 65° C. while being stirred, to which an n-heptane solution containing 5250 mmol (based on magnesium) of an organomagnesium complex component represented by the compositional formula: $AlMg_6(C_2H_5)_3(n-C_4H_9)_{12}$ was added over two hours. The resulting mixture was reacted at 65° C. for one hour under stirring. After the completion of the reaction, the supernatant was removed and the residue was washed four times with 7 liters of n-hexane, to thereby obtain a solid substance in the form of a slurry. The solid substance was separated and then dried. As a result of the analysis of the solid thus obtained, it contained 10.2 mmol of Mg and 20.6 mmol of Cl per gram of the solid. The slurry containing 500 g of the above-described solid and 2540 ml of a 1 mol/liter n-hexane solution of n-butyl alcohol were then reacted at 50° C. for one hour under stirring. After the completion of the reaction, the supernatant was removed and the residue was washed once with 7 liters of n-hexane. The resulting slurry was maintained at 50° C. To the slurry, 1140 ml of a 1 mol/liter n-hexane solution of diethylaluminum chloride were added under stirring and they were reacted for one hour. After the completion of the reaction, the supernatant was removed, and the residue was washed twice with 7 liters of n-hexane. The resulting slurry was maintained at 50° C. To the slurry, 260 ml of a 1 mol/liter n-hexane solution of diethylaluminum chloride and 260 ml of a 1 mol/liter n-hexane solution of titanium tetrachloride were added and they were reacted for two hours. After the completion of the reaction, the supernatant was removed. With the internal temperature being maintained at 50° C. the residue was washed four times with 7 liters of n-hexane, to thereby obtain a solid catalyst component [A-3]. In the solid catalyst component thus obtained, the molar ratio of the alkoxy group/titanium was 1.00 and that of the alkoxy group/magnesium was 0.047. In the supernatant of the slurry the chlorine ion concentration was 3.2 mmol/liter and the aluminum ion concentration was 4.6 mmol/liter. As the result of the polymerization using the catalyst thus obtained as in Example 1, the average polymerization activity was 18000 g-polymer/g-catalyst·hr and almost no deterioration in the activity was recognized for three-week operation. The polymer thus obtained had an MI of 1.0 g/10 min, an FR of 44.8 and a bulk density of 0.42 g/cm$^3$. Heat was removed stably by passing water through the jacket. The overall heat transfer coefficient on the transfer surface immediately after the beginning of the polymerization was 497 kcal/m$^2$·hr·deg, while that immediately before the completion of the present invention was 464 kcal/m$^2$·hr·deg. As a result of overhaul inspection after the operation had finished, almost no deposition of the polymer was recognized onto the wall of the reactor.

Example 4

Under similar conditions to Example 3, except that n-butyl alcohol was used in an amount of 1270 ml and the amount of diethylaluminum chloride was changed from 1140 ml to 1780 ml, a solid catalyst component [A-4] was synthesized. In the solid catalyst component [A-4] thus obtained, the molar ratio of the alkoxy group/titanium was 0.02 and that of the alkoxy group/magnesium was 0.001. In the supernatant of the slurry solution, the chlorine ion concentration was 3.5 mmol/liter and the aluminum ion concentration was 4.8 mmol/liter. As the result of the polymerization using the catalyst as in Example 1, the average polymerization activity was 21000 g-polymer/g-catalyst·hr and almost no deterioration in the activity was recognized for three-week operation. The polymer thus obtained had an MI of 0.8 g/10 min, an FR of 68.6 and a bulk density of 0.43 g/cm$^3$. Heat was removed stably by passing water through the jacket. The overall heat transfer coefficient immediately after the beginning of the polymerization was 475 kcal/m$^2$·hr·deg, while that immediately before the completion of the present invention was 440 kcal/m$^2$·hr·deg. As the result of overhaul inspection after the operation had finished, almost no deposition of the polymer was recognized onto the wall of the reactor.

Example 5

A solid catalyst component was synthesized under the following conditions.

In a fully-nitrogen-purged 1-liter flask, 240 ml of trichlorosilane (HSiCl$_3$) as a 1 mol/liter n-heptane solution were charged. They were kept at 50° C. while being stirred, to which a n-heptane solution containing 180 mmol (based on magnesium) of an organomagnesium complex component represented by the compositional formula: AlMg$_6$(C$_2$H$_5$)$_3$ (n-C4H$_9$) $_{6.4}$(On-C$_4$H$_9$)$_{5.6}$ was added over one hour. The resulting mixture was reacted at 50° C. for one hour under stirring. After the completion of the reaction, the supernatant was removed and the residue was washed four times with 250 ml of n-hexane, to thereby obtain a solid substance in the form of a slurry. The solid substance was separated and then dried. As a result of the analysis of the solid thus obtained, it contained 7.45 mmol of Mg and 13.8 mmol of Cl per gram of the solid. In a fully-nitrogen-purged 300-ml flask, the slurry containing 5 g of the above-described solid was reacted with 12.2 ml of a 1 mol/liter n-hexane solution of n-butyl alcohol at 50° C. for one hour under stirring. After the completion of the reaction, the supernatant was removed and the residue was washed once with 100 ml of n-hexane. The resulting slurry was maintained at 50° C. To the slurry, 8.4 ml of a 1 mol/liter n-hexane solution of diethylaluminum chloride were added under stirring and they were reacted for one hour. After the completion of the reaction, the supernatant was removed, and the residue was washed twice with 100 ml of n-hexane. The resulting slurry was maintained at 50° C. To the slurry, 1.9 ml of a 1 mol/liter n-hexane solution of diethylaluminum chloride and 1.9 ml of a 1 mol/liter n-hexane solution of titanium tetrachloride were added and they were reacted for two hours. After the completion of the reaction, the supernatant was removed. The residue was washed seven times with 100 ml of n-hexane, to thereby obtain a solid catalyst component [A-5]. In the solid catalyst component thus obtained, the molar ratio of the alkoxy group/titanium was 2.38 and that of the alkoxy group/magnesium was 0.149. In the supernatant of the slurry solution of the solid catalyst, the chlorine ion concentration was 4.0 mmol/liter and the aluminum ion concentration was 3.9 mmol/liter. On the other hand, under the similar conditions to [A-5], except that n-butyl alcohol was used in an amount of 9.3 ml and the amount of diethylaluminum chloride was changed from 8.4 ml to 13.0 ml, a solid catalyst component [A-6] was synthesized. In the solid catalyst component thus obtained, the molar ratio of the alkoxy group/titanium was 1.63 and that of the alkoxy group/magnesium was 0.108. In the supernatant of the slurry of the solid catalyst, the chlorine ion concentration was 4.2 mmol/liter and the aluminum ion concentration was 4.3 mmol/liter. Into a 1.5-liter autoclave having an inside fully purged with nitrogen and dried in a vacuum, 5 mg of the solid catalyst component [A-5] and 0.2 mmol of triisobutyl aluminum were introduced together with 800 ml of dehydrated and deaerated n-hexane. The autoclave was heated to have an internal temperature of 80° C. and pressurized with hydrogen to a gauge pressure of 4.2 kg/cm$^2$, followed by introduction of ethylene to increase the total pressure to 10 kg/cm$^2$. While maintaining the gauge pressure at 10 kg/cm$^2$ by the supplementary introduction of ethylene, polymerization was effected for 2 hours, to thereby obtain 308 g of a polymer. The polymer thus obtained had a catalytic efficiency of 30800 g-polymer/g-catalyst·hr (166000 g-PE/mmol-Ti), an MI of 2.8 g/10 min, an FR of 28.6 and a bulk density of 0.44 g/cm$^3$. On the other hand, when the solid catalyst component ( A-6) was employed under the same polymerization conditions, 330 g of a polymer were obtained. It had a catalytic efficiency of 33000 g-polymer/g-catalyst·hr (137700 g-PE/mmol-Ti), an MI of 4.3 g/10 min, an FR of 35.9 and a bulk density of 0.43 g/cm$^3$.

Example 6

In a similar manner to Example 5, except that prior to use for the polymerization, the catalyst solution prepared in Example 5 was allowed to stand at 20° C. for 3 months, ethylene was polymerized. When [A-5] was employed, 300 g of a polymer having an MI of 2.6 g/10 min, an FR of 28.8 and a bulk density of 0.43 g/cm$^3$ were obtained. On the other hand, when [A-6] was employed, 320 g of a polymer having an MI of 4.1 g/10 min, an FR of 35.7 and a bulk density of 0.41 g/cm$^3$ were obtained.

Example 7

In a nitrogen gas stream, silica ("Davison 952", trade name) having a surface area of 365 m$^2$/g, pore volume of 1.7 ml/g and average particle size of 65 μm was dried at 350° C. for 2 hours. In a fully dried and nitrogen-purged flask, a 5 g portion of the dried silica was charged, together with 30 ml of n-hexane, followed by suspending under stirring. To the resulting slurry, 100 mmol (based on magnesium) of an organomagnesium component represented by the compositional formula: AlMg$_6$(C$_2$H$_5$)$_3$(n-C$_4$H$_9$)l$_2$ and 100 ml of a 1 mol/liter n-heptane solution of trichlorosilane (HSiCl$_3$) were simultaneously added dropwise under stirring over one hour while maintaining the temperature at 60° C. At the same temperature, reaction was effected for further one hour. After the completion of the reaction, the supernatant was removed and the residue was washed four times with 250 ml of n-hexane, to thereby obtain a solid substance in the form of a slurry. The solid substance was separated and then dried. As a result of the analysis of the solid thus obtained, 5.15 mmol of Mg and 10.2 mmol of Cl were contained per gram of the solid. In a fully nitrogen-purged 300-ml flask, the resulting slurry containing 5 g of the solid and 16.1 ml of a 1 mol/liter n-hexane solution of n-butyl alcohol were reacted at 50° C. for one hour under stirring. After the completion of the reaction, the supernatant was removed and the residue was washed once with 100 ml of n-hexane. The resulting slurry was maintained at 50° C. To the slurry, 7.3 ml of a 1 mol/liter n-hexane solution of diethylaluminum chloride were added under stirring and they were reacted for one hour. After the completion of the reaction, the supernatant was removed, and the residue was washed twice with 100 ml of n-hexane. The resulting slurry was maintained at 50° C. To the slurry, 1.6 ml of a 1 mol/liter n-hexane solution of diethylaluminum chloride and 1.6 ml of a 1 mol/liter n-hexane solution of titanium tetrachloride were added and they were reacted for two hours. After the completion of the reaction, the supernatant was removed. The residue was washed seven times with 100 ml of n-hexane, to thereby obtain a solid catalyst component [A-7]. In the solid catalyst component thus obtained, the molar ratio of the alkoxy group/titanium was 0.81 and that of the alkoxy group/magnesium was 0.043. In the supernatant of the slurry of the solid catalyst, the chlorine ion concentration was 1.9 mmol/liter and the aluminum ion concentration was 1.8 mmol/liter. On the other hand, under similar conditions to [A-7], except that n-butyl alcohol was used in an amount of 3.2 ml and the amount of diethylaluminum chloride was changed from 7.3 ml to 16.1 ml, a solid catalyst component [A-8] was synthesized. In the solid catalyst component thus obtained, the molar ratio of the alkoxy group/titanium was 0.25 and that of the alkoxy group/magnesium was 0.001. In the supernatant of the slurry of the solid catalyst, the chlorine ion concentration was 2.2 mmol/liter and the aluminum ion concentration was 2.3 mmol/liter. The polymerization was effected in a similar manner to Example 5 by using the solid catalyst component [A-7], to thereby obtain 154 g of a polymer. The polymer thus obtained had a catalytic efficiency of 15400 g-polymer/g-catalyst·hr (138300 g-PE/mmol-Ti), an MI of 1.9, an FR of 58.7 and a bulk density of 0.42 g/cm³. On the other hand, when the polymerization was effected in a similar manner to Example 5 by using the solid catalyst component [A-8],120 g of a polymer were obtained. The polymer thus obtained had a catalytic efficiency of 12000 g-polymer/g-catalyst·hr (114400 g-PE/mmol-Ti), an MI of 1.1, an FR of 78.1 and a bulk density of 0.41 g/cm³.

Example 8

In a similar manner to Example 5, except that prior to use for polymerization, the catalyst solutions prepared in Example 7 were allowed to stand for three months at 20° C., ethylene was polymerized. When [A-7] was used, 150 g of a polymer having an MI of 1.6 g/min, an FR of 58.0 and a bulk density of 0.42 g/cm³ were obtained. When [A-8] was used, on the other hand, 115 g of a polymer having an MI of 1.1 g/10 min, an FR of 75.7 and a bulk density of 0.40 g/cm³ were obtained.

Comparative Example 1

In a similar manner to the synthesis of [A-1] in Example 1, except for the use of 4320 ml of n-butyl alcohol, a solid catalyst component [A-9] was synthesized. In the solid catalyst component thus obtained, the molar ratio of the alkoxy group/titanium was 3.98 and that of the alkoxy group/magnesium was 0.251. In the supernatant of the slurry, the chlorine ion concentration was 2.3 mmol/liter and the aluminum ion concentration was 3.3 mmol/liter. On the other hand, in a similar manner to the synthesis of [A-2] in Example 2, except for the use of 4320 ml of n-butyl alcohol, a solid catalyst component [A-10] was synthesized. In the solid catalyst component thus obtained, the molar ratio of the alkoxy group/titanium was 2.52 and that of the alkoxy group/magnesium was 0.148. In the supernatant of the slurry, the chlorine ion concentration was 2.4 mmol/liter and the aluminum ion concentration was 3.2 mmol/liter. In a similar manner to Example 5, polymerization was effected using the catalyst solid component [A-9], to thereby obtain 210 g of a polymer having an MI of 2.8, an FR of 24.0 and a bulk density of 0.38 g/cm³. When [A-10] was used, on the other hand, 160 g of a polymer having an MI of 2.5, an FR of 24.2 and a bulk density of 0.37 g/cm³ were obtained. The an FR of [A-10] was found to be almost the same with that of [A-9].

Reference Example 1

In a similar manner to Example 5, except that upon preparation of [A-5], washing seven times with 100 ml of n-hexane was replaced by washing twice with 100 ml of n-hexane, a solid catalyst component was obtained. In the supernatant of the slurry, of the solid catalyst thus obtained, the chlorine ion concentration was 8.0 mmol/liter and the aluminum ion concentration was 9.9 mmol/liter. In a similar manner to Example 5, except that prior to use for polymerization, the catalyst solution was allowed to stand for 3 months at 20° C., ethylene was polymerized. As a result, 193 g of a polymer were obtained. The polymer thus obtained had a catalytic efficiency of 19300 g-polymer/g-catalyst·hr (104000 g-PE/mmol-Ti), an MI of 1.8 g/10 min, an FR of 30.6 and a bulk density of 0.34 g/cm³.

Reference Example 2

In a similar manner to Example 1, except that instead of washing four times with 7 liters of h-hexane at the internal temperature kept at 50° C., washing was conducted twice with 7 liters of n-hexane after cooling to room temperature, a solid catalyst component was obtained. In the solid catalyst component thus obtained, the molar ratio of the alkoxy group/titanium was 2.17 and that of the alkoxy group/magnesium was 0.119. In the supernatant of the slurry of the solid catalyst, the chlorine ion concentration was 11.5 mmol/liter and the aluminum ion concentration was 6.9 mmol/liter. In a similar manner to Example 1, polymerization was conducted using the catalyst. As a result, the polymerization activity was 20000 g-polymer/g-catalyste·hr immediately after the beginning of the polymerization, which lowered to 17000 g-polymer/g-catalyst·hr on Day 12. The overall heat transfer coefficient (U) on the transfer surface of the reactor was 470 kcal/m²·hr-deg immediately after the beginning of the polymerization, which, however, lowered to 350 kcal/m²·hr·deg on Day 12, resulting in the termination of the polymerization. As a result of overhaul inspection of the reactor after the operation had finished, waxy deposition was recognized all over the wall of the reactor. Based on those results, long-term operation was judged difficult.

Examples 9 to 12

In a similar manner to Example 5, except for the use of the conditions as shown in Table 1, solid catalysts were synthesized. Into a 1.5-liter autoclave having an inside fully purged with nitrogen and dried in a vacuum, each of the solid catalyst components thus obtained was introduced together with 0.2 mmol of triisobutyl aluminum, 760 ml of dehydrated and deaerated n-hexane and 40 ml of 1-hexene. The autoclave was then heated to increase its internal temperature to 60° C. and pressurized to 1.0 kg/cm$^2$ with hydrogen, followed by the introduction of ethylene to heighten the total pressure to 2 kg/cm$^2$. Polymerization was effected under the conditions as shown in Table 2 while the total pressure was maintained at a gauge pressure of 2.0 kg/cm$^2$. The results are shown in Table 2.

synthesized. Into a 1.5-liter autoclave having an inside fully purged with nitrogen and dried in a vacuum, each of the solid catalyst components thus obtained was introduced together with 0.25 mmol of triethylaluminum, 750 ml of dehydrated and deaerated n-hexane and 50 ml of 1-butene. The autoclave was then heated to increase its internal temperature to 80° C. and pressurized to 1.6 kg/cm$^2$ with hydrogen, followed by the introduction of ethylene to heighten the total pressure to 4 kg/cm$^2$. Polymerization was

TABLE 1

| | Synthesis of solid (1) | | | | | | Solid catalyst component | | |
|---|---|---|---|---|---|---|---|---|---|
| | Organo- | | Reaction conditions | | | | Aloxy group/ Ti | Alkoxy group/ Mg | |
| | magnesium component[a] | Chloro- silane[b] | Temp (° C.) | Time (hr) | Alcohol[b] | Component (2)[b] | Component (3)[b] | molar ratio | molar ratio | Solid catalyst No. |
| Ex. 9 | A | HSiCl$_3$(1.3) | 50 | 2 | Hexyl alcohol (0.5) | Et$_2$Al(OEt) (0.2) | Et$_2$AlCl (0.06) + TiCl$_4$ (0.06) | 2.34 | 0.149 | A-11 |
| | A | HSiCl$_3$(1.3) | 50 | 2 | Hexyl alcohol (0.5) | Et$_2$Al(OEt) (1.0) | Et$_2$AlCl (0.06) + TiCl$_4$ (0.06) | 0.43 | 0.023 | A-12 |
| Ex. 10 | B | HSiCl$_2$CH$_3$ (1.5) | 60 | 1.5 | n-Propyl alcohol (0.3) | — | iso-Bu$_3$Al (0.2) + TiCl$_4$ (0.1) | 1.62 | 0.134 | A-13 |
| | B | HSiCl$_2$CH$_3$ (1.5) | 60 | 1.5 | n-Propyl alcohol (0.1) | — | iso-Bu$_3$Al (0.2) + TiCl$_4$ (0.1) | 0.58 | 0.054 | A-14 |
| Ex. 11 | C | HSiCl(CH$_3$)$_2$ (2) | 50 | 1 | Stearyl alcohol | iso-Bu$_3$Al (0.2) | TiCl$_4$ (0.05) | 1.30 | 0.104 | A-15 |
| | C | HSiCl(CH$_3$)$_2$ (2) | 50 | 1 | Stearyl alcohol | iso-Bu$_3$Al (0.2) | TiCl$_4$ (0.05) | 0.64 | 0.051 | A-16 |
| Ex. 12 | D | HSiCl$_2$CH$_3$ (1.3) | 50 | 1 | Benzyl alcohol (0.4) | Et$_2$AlCl (0.3) | Et$_2$AlCl (0.3) + TiCl$_4$ (0.3) | 0.31 | 0.016 | A-17 |
| | D | HSiCl$_2$CH$_3$ (1.3) | 50 | 1 | Benzyl alcohol (0.2) | Et$_2$AlCl (0.3) | Et$_2$AlCl (0.3) + TiCl$_4$ (0.3) | 0.12 | 0.006 | A-18 | a: A = AlMg$_8$/(C$_2$H$_5$)$_3$(n-C$_4$H$_9$)$_{12}$(O-C$_8$H$_{17}$)$_4$, B = ZnMg$_6$(n-C$_4$H$_9$)$_5$(O-iso-C$_6$H$_{13}$)$_9$, C = sec-Bu$_2$Mg, D = AlMg$_{10}$(C$_2$H$_5$)$_5$(n-C$_8$H$_{17}$)$_7$(O—C$_4$H$_9$)$_{11}$
b: The number in parenthesis represents the molar ratio of that component to Mg.

TABLE 2

| Catalyst No. | Solid catalyst component (mg) | Polymerization time (min) | Catalytic efficiency (kg-PE/g-Ti · time · ethylene pressure) | MI (g/10 min) | FR | Density (g/cm$^3$) |
|---|---|---|---|---|---|---|
| A-11 | 15 | 60 | 180 | 2.1 | 25.8 | 0.9212 |
| A-12 | 15 | 60 | 200 | 1.8 | 50.9 | 0.9220 |
| A-13 | 20 | 45 | 185 | 2.3 | 30.0 | 0.9175 |
| A-14 | 20 | 35 | 160 | 2.2 | 41.7 | 0.9186 |
| A-15 | 25 | 50 | 150 | 4.2 | 31.2 | 0.9236 |
| A-16 | 25 | 40 | 170 | 3.5 | 44.0 | 0.9254 |
| A-17 | 30 | 60 | 135 | 1.7 | 57.3 | 0.9265 |
| A-18 | 30 | 60 | 115 | 1.9 | 66.8 | 0.9251 |

EXAMPLES 13 TO 16

In a similar manner to Example 5, except for the use of the conditions shown in Table 3, solid catalyst components were effected under the conditions as shown in Table 4 while the total pressure was maintained at a gauge pressure of 4.0 kg/cm$^2$ by the supplementary introduction of ethylene. The results are shown in Table 4.

TABLE 3

| | Synthesis of solid (1) | | | | | | | Solid catalyst component | | |
|---|---|---|---|---|---|---|---|---|---|---|
| | Organo- | | Reaction conditions | | | | | Aloxy group/ Ti | Alkoxy group/ Mg | Solid |
| | magnesium component[a] | Chloro- silane[b] | Temp (°C.) | Time (hr) | Alcohol[b] | Component (2)[b] | Component (3)[b] | molar ratio | molar ratio | catalyst No. |
| Ex. 13 | A | HSiCl$_3$(1) | 65 | 2 | Amyl alcohol (0.7) | BuLi (0.7) | Et$_2$AlCl (0.05) + TiCl$_4$ (0.05) | 2.35 | 0.131 | A-19 |
| | A | HSiCl$_3$(1) | 65 | 2 | Amyl alcohol (0.4) | BuLi (0.7) | Et$_2$AlCl (0.05) + TlCl$_4$ (0.05) | 1.86 | 0.098 | A-20 |
| Ex. 14 | B | HSiCl$_2$C$_2$H$_5$ (1.2) | 40 | 1 | Phenol (0.3) | n-Octyl$_3$Al (0.1) | EtMgBr (0.2) + TiCl$_4$ (0.1) | 1.25 | 0.083 | A-21 |
| | B | HSiCl$_2$C$_2$H$_5$ (1.2) | 40 | 1 | Phenol (0.1) | n-Octyl$_3$Al (0.1) | EtMgBr (0.2) + TiCl$_4$ (0.1) | 0.52 | 0.031 | A-22 |
| Ex. 15 | C | HSiPhCl$_2$ (1.5) | 50 | 1 | m-Cresol (0.6) | EtAlCl$_2$ (0.2) | TiCl$_3$(O-butyl) (0.05) | 2.30 | 0.128 | A-23 |
| | C | HSiPhCl$_2$ (1.5) | 50 | 1 | m-Cresol (0.6) | EtAlCl$_2$ (0.4) | TiCl$_3$(O-butyl) (0.05) | 1.46 | 0.091 | A-24 |
| Ex. 16 | D | HSiCl$_2$C$_4$H$_9$ (1.3) | 50 | 1 | n-Octyl alcohol (0.4) | Et$_2$AlCl (0.3) | Et$_2$AlCl (0.1) + Ti(OEt)$_4$ (0.1) | 0.81 | 0.045 | A-25 |
| | D | HSiCl$_2$C$_4$H$_9$ (1.3) | 50 | 1 | n-Octyl alcohol (0.2) | Et$_2$AlCl (0.3) | Et$_2$AlCl (0.1) + Ti(OEt)$_4$ (0.1) | 0.32 | 0.019 | A-26 | a: A = BeMg$_2$(C$_2$H$_5$)$_2$(n-C$_4$H$_9$)$_4$, B = BMg(C$_2$H$_5$)$_{2.8}$(n-C$_4$H$_9$)$_{1.5}$(S—C$_2$H$_5$)$_{0.7}$, C = LiMg$_3$(n-C$_4$H$_9$)$_4$(C$_2$H$_5$), D = (n-C$_4$H$_9$)Mg(C$_2$H$_5$)
b: The number in parenthesis represents the molar ratio of that component to Mg.

TABLE 4

| Catalyst No. | Solid catalyst component (mg) | Polymerization time (min) | Catalytic efficiency (kg-PE/g-Ti · time · ethylene pressure) | MI (g/10 min) | FR | Density (g/cm$^3$) |
|---|---|---|---|---|---|---|
| A-19 | 10 | 60 | 280 | 3.5 | 26.0 | 0.9452 |
| A-20 | 10 | 60 | 250 | 3.1 | 45.1 | 0.9472 |
| A-21 | 10 | 50 | 275 | 1.9 | 41.1 | 0.9465 |
| A-22 | 10 | 50 | 240 | 2.4 | 60.1 | 0.9483 |
| A-23 | 15 | 60 | 230 | 1.5 | 34.9 | 0.9516 |
| A-24 | 15 | 60 | 270 | 1.7 | 42.3 | 0.9547 |
| A-25 | 10 | 45 | 265 | 2.1 | 55.5 | 0.9454 |
| A-26 | 10 | 45 | 235 | 2.8 | 69.5 | 0.9450 |

Examples 17 to 19

In each of Examples 17 to 19, in a similar manner to Example 13, except that the solid catalyst [A-1] obtained in Example 1 or [A-2] obtained in Example 2 was used as a catalyst and a comonomer as shown in Table 5 was used instead of 1-butene, copolymerization was effected. The results are shown in Table 5.

Examples 20 to 22

In each of the examples 20 to 22, in a similar manner to Example 5, except that the solid catalyst component obtained In Example 3, or Example 4, and an organometallic compound as shown in Table 6 were used in combination, polymerization was effected. The results are shown in Table 6.

TABLE 5

| | Catalyst No. | Comonomer | Catalytic efficiency (kg-PE/g-Ti · time · ethylene pressure) | MI (g/10 min) | FR | Density (g/cm$^3$) |
|---|---|---|---|---|---|---|
| Example 17 | A-1 | Propylene | 300 | 3.7 | 25.1 | 0.9352 |
| | A-2 | Propylene | 265 | 2.9 | 35.9 | 0.9338 |
| Example 18 | A-1 | Octene-1 | 250 | 1.9 | 26.2 | 0.9512 |
| | A-2 | Octene-1 | 235 | 1.8 | 39.1 | 0.9521 |
| Example 19 | A-1 | 4-Methylpentene-1 | 230 | 2.1 | 26.5 | 0.9525 |
| | A-2 | 4-Methylpentene-1 | 220 | 2.4 | 38.7 | 0.9514 |

TABLE 6

| Catalyst No. | | Organometallic component | Catalytic efficiency (kg-PE/g-Ti · time · ethylene pressure) | MI (g/10 min) | FR | BD (g/cm$^3$) |
|---|---|---|---|---|---|---|
| Example 20 | A-3 | AlMg$_6$(C$_2$H$_5$)$_3$(C$_4$H$_9$)$_{12}$ | 236 | 2.8 | 55.1 | 0.41 |
| | A-4 | AlMg$_6$(C$_2$H$_5$)$_3$(C$_4$H$_9$)12 | 208 | 2.2 | 90.3 | 0.43 |
| Example 21 | A-3 | AlMg(C$_2$H$_5$)$_3$(C$_4$H$_9$)$_2$ | 246 | 4.1 | 48.2 | 0.44 |
| | A-4 | AlMg(C$_2$H$_5$)$_3$(C$_4$H$_9$)$_2$ | 212 | 3.5 | 76.8 | 0.44 |
| Example 22 | A-3 | Mg(C$_2$H$_5$)(C$_4$H$_9$) | 210 | 1.5 | 60.3 | 0.42 |
| | A-4 | Mg(C$_2$H$_5$)(C$_4$H$_9$) | 220 | 1.4 | 91.5 | 0.43 |

Example 23

In a similar manner to Example 7, except that the silica gel was replaced by silica alumina which had a surface area of 390 m$^2$/g, pore volume of 2 ml/g and average particle size of 50 μm and had been dried at 200° C. for 4 hours under a nitrogen gas stream, synthesis was carried out under the conditions as shown in Example 7, to thereby obtain a solid catalyst component [A-27]. In the solid catalyst component thus obtained, the molar ratio of the alkoxy group/titanium was 0.72 and that of the alkoxy group/magnesium was 0.036. In the supernatant of the slurry of the solid catalyst, the chlorine ion concentration was 1.4 mmol/liter and the aluminum ion concentration was 1.6 mmol/liter. On the other hand, under similar conditions to [A-27], except that of n-butyl alcohol was used in an amount of 6.2 ml and the amount of diethylaluminum chloride was changed from 7.3 ml to 16.1 ml, synthesis was effected to obtain a solid catalyst component [A-28]. In the solid catalyst component thus obtained, the molar ratio of the alkoxy group/titanium was 0.22 and that of the alkoxy group/magnesium was 0.011. In the supernatant of the slurry of the solid catalyst, the chlorine ion concentration was 1.9 mmol/liter and the aluminum ion concentration was 2.1 mmol/liter. When polymerization was conducted using the solid catalyst component (A-27) in a similar manner to Example 5, 105 g of a polymer were obtained. The polymer thus obtained had a catalytic efficiency of 21000 g-polymer/g-catalyst·hr (114400 g-PE/mmol-Ti), an MI of 3.9, an FR of 61.2 and a bulk density of 0.44 g/cm$^3$. On the other hand, the polymerization using (A-28) resulted in the preparation of 110 g of a polymer. The polymer thus obtained had a catalytic efficiency of 22000 g-polymer/g-catalyst·hr (116600 g-PE/mmol-Ti), an MI of 3.5, an FR of 86.7 and a bulk density of 0.42 g/cm$^3$.

Upon preparation of a polyolefin, the catalyst according to the present invention makes it possible to control the molecular weight distribution easily and provide a polyolefin, which has excellent properties, with good powder properties owing to its markedly high activity of the catalyst. Furthermore, according to the use of the catalyst of the present invention, a reduction in the activity is small even after long-term storage and deposition onto the wall of the reactor does not occur upon slurry polymerization, which permits long-term continuous stable operation.

While the invention has been described in detail and with reference to specific examples thereof, it will be apparent to one skilled in the art that various changes and modifications can be made therein without departing from the spirit and scope thereof.

What is claimed is:

1. An olefin polymerization catalyst comprising (A) a solid catalyst component and (B) an organometallic compound component, wherein said solid catalyst component (A) is prepared by a process comprising the steps of:
   (I). obtaining a solid (A-1) by reacting:
      (i) organomagnesium component which is soluble in a hydrocarbon solvent and which is represented by the formula:

$(M^1)_\alpha(Mg)_\beta(R^1)_p(R^2)_q(OR^3)_r$ wherein $M^1$ represents an element belonging to Groups 1, 2, 12 or 13 of the periodic table, $R^1$, $R^2$ and $R^3$ each independently represent a $C_{2-20}$ hydrocarbon group, and α, β, p, q, and r are numerals which satisfy the relationships: $0 \leq \alpha$; $0 < \beta$; $0 \leq p$; $0 \leq q$; $0 \leq r$, $p+q>0$; $0 \leq r/(\alpha+\beta) \leq 2$; and $k\alpha+2\beta=p+q+r$, with the proviso that k represents a valence of $M^1$; and
      (ii) Si—H bond-containing chlorosilane compound represented by the formula: $H_a SiCl_b R^4_{4-(a+b)}$ wherein $R^4$ represents a $C_{1-20}$ hydrocarbon group and a and b are numerals which satisfy the relationships: $0<a$; $0<b$; and $a+b \leq 4$, in a ratio of from 0.01 to 100 mol (ii) per mol (i);
   (II). reacting the solid (A-1) with an alcohol (A-2) in a ratio of from 0.05 to 20 mol of the alcohol per mol of C—Mg bonds contained in the solid (A-1), to form a reaction product; and
   (III). reacting the reaction product with a titanium compound (A-4), the solid catalyst component (A) being adjusted to have an alkoxy group/titanium molar ratio of 2.4 or lower and an alkoxy group/magnesium molar ratio of 0.15 or lower.

2. The olefin polymerization catalyst according to claim 1, wherein the solid (A-1) and the alcohol (A-2) are reacted to form an intermediate, following said reaction said intermediate is reacted with a component (A-3) represented by the formula: $M^2 R^5_s Q_{t-s}$ wherein $M^2$ represents an element belonging to Groups 1, 2, 12 or 13 of the periodic table, $R^5$ represents a $C_{1-20}$ hydrocarbon group, Q represents a group selected from the group consisting of $OR^6$, $OSiR^7R^8R^9$, $NR^{10}R^{11}$, $SR^{12}$ and halogen atoms (wherein $R^6$, $R^7$, $R^8$, $R^9$, $R^{10}$, $R^{11}$ and $R^{12}$ each independently represents a hydrogen atom or a hydrocarbon group), $0<s$ and t stands for a valence of $M^2$, to form a reaction product.

3. The olefin polymerization catalyst according to claim 1, wherein the amount of said component (A-2) is from 0.1 to 10 mol per mol of C—Mg bonds in said solid (A-1).

4. The olefin polymerization catalyst according to claim 1, wherein $M^1$ in said organomagnesium compound represented by the following formula: $(M^1)_\alpha(Mg)_\beta(R^1)_p(R^2)_q(OR^3)_r$ is Al, B, Zn or Be.

5. The olefin polymerization catalyst according to claim 1, wherein said organomagnesium compound represented by the following formula: $(M^1)_\alpha(Mg)_\beta(R^1)_p(R^2)_q(OR^3)_r$ satisfies relationships: $\alpha>0$; $0.5 \leq \beta/\alpha \leq 10$; and $0 \leq r(\alpha+\beta)<1$.

6. The olefin polymerization catalyst according to claim 1, wherein said organometallic compound component (B) is an organomagnesium compound or organoaluminum compound.

7. The olefin polymerization catalyst according to claim 6, wherein the organometallic compound component (B) is an organoaluminum compound.

8. The olefin polymerization catalyst according to claim 1, wherein $R^1$ in said organomagnesium compound represented by the formula: $(M^1)_\alpha(Mg)_\beta(R^1)_p(R^2)_q(OR^3)_r$ is an alkyl group.

9. The olefin polymerization catalyst according to claim 1, wherein said titanium compound (A-4) is a titanium tetrahalide compound.

10. The olefin polymerization catalyst according to claim 1, wherein the component (A-2) is an alcohol other than methanol or ethanol.

11. The olefin polymerization catalyst according to claim 2, wherein the component (A-4) is reacted with said reaction product and an additional portion of component (A-3).

12. The olefin polymerization catalyst according to claim 2, wherein said component (A-3) represented by the formula: $M^2R^5_sQ_{t-s}$ is an organoaluminum compound.

13. The olefin polymerization catalyst according to claim 2, wherein Q in said component (A-3) represented by the formula: $M^2R^5_sQ_{t-s}$ is a halogen.

14. The olefin polymerization catalyst according to claim 2, wherein $M^2$ in said component (A-3) represented by the formula: $M^2R^5_sQ_{t-s}$ is Mg, B or Al.

15. The olefin polymerization catalyst according to claim 2, wherein the component (A-3) is used in a molar ratio to said alcohol (A-2) of from not less than 0.1 to less than 10, and said titanium compound (A-4) is used in an amount of 0.5 mol or less per mol of C—Mg bonds contained in said solid (A-1), and wherein the solid catalyst component (A) is prepared as a slurry in an inert solvent, and the supernatant of the slurry has chlorine ion concentration and an aluminum ion concentration of each 5 mmol/liter or lower.

* * * * *